May 15, 1962 A. R. WILLIAMS 3,034,248
POLE TIP ASSEMBLY FOR A FISHING POLE
Filed March 23, 1959
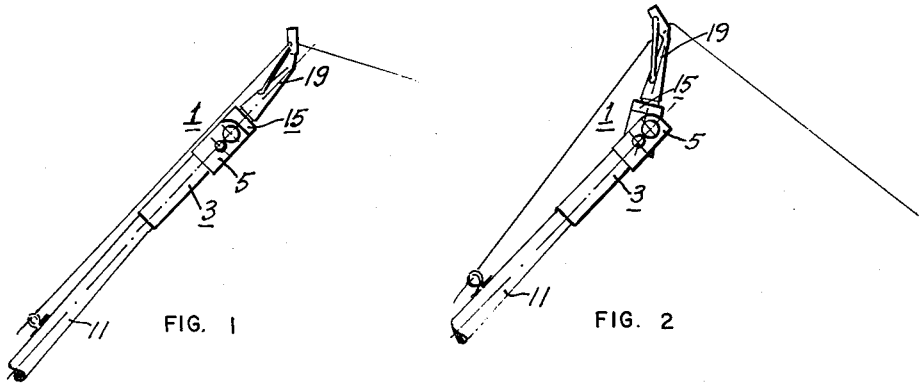
FIG. 1
FIG. 2
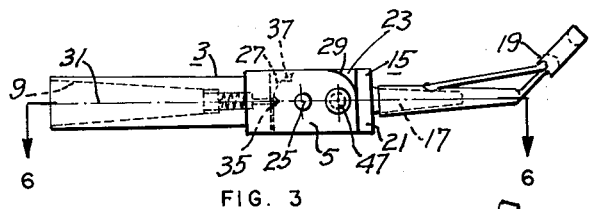
FIG. 3
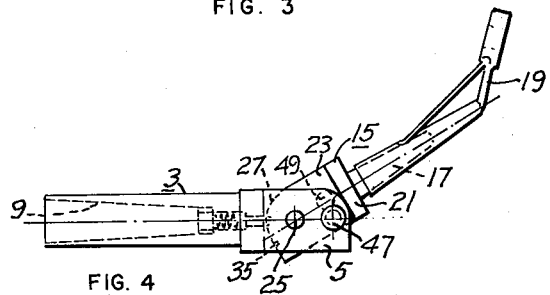
FIG. 4
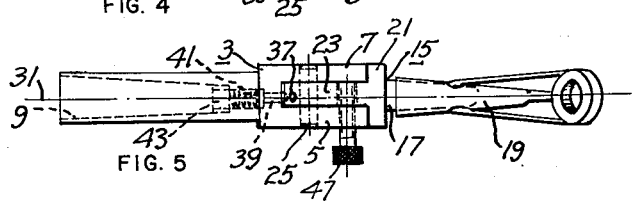
FIG. 5
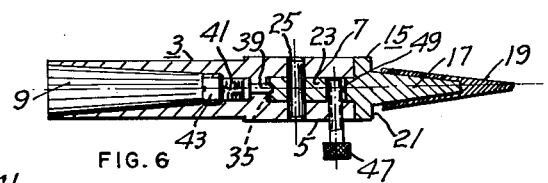
FIG. 6
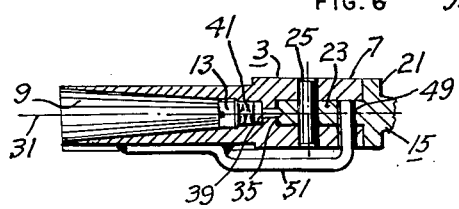
FIG. 7
INVENTOR
ARLINGTON R. WILLIAMS
BY
*Bruce & Brosler*
ATTORNEYS 3,034,248
POLE TIP ASSEMBLY FOR A FISHING POLE
Arlington R. Williams, 10606 San Pablo Ave., El Cerrito, Calif.
Filed Mar. 23, 1959, Ser. No. 801,369
2 Claims. (Cl. 43—24)

My invention relates to fishing pole equipment and more particularly to the pole tip assembly mounted at the tip end of such pole.

It is often the practice of a fisherman, when he tires of holding a pole and desires relaxation, to place his pole in a supporting bracket or otherwise mechanically supports the same, and trusts to luck, if he gets a bite, that the fish will hook itself, at least sufficiently to provide the fisherman an opportunity to grab his pole and set the hook. By the time this can happen, the fish in most instances, however, will have taken off with the bait, leaving the hook free and empty.

Among the objects of my invention are:

(1) To provide a novel and improved means for materially increasing the chances of catching a fish with an unattended pole;

(2) To provide a novel and improved means for mechanically setting a hook, when a fish takes the baited hook of an unattended pole;

(3) To provide a novel and improved pole tip assembly for a fishing pole;

(4) To provide a novel and improved pole tip assembly for a fishing pole, which will mechanically set the hook when a baited hook is taken by a fish.

Additional objects of my invention will be brought out in the following description of a preferred embodiment of the same, taken in conjunction with the accompanying drawings, wherein:

FIGS. 1 and 2 depict the pole tip assembly of the present invention as mounted on a fishing pole and illustrating the same in the two stable positions provided therefor;

FIG. 3 is an enlarged view in side elevation, of the pole tip assembly of the present invention depicting the same in one of its two stable poistions;

FIG. 4 is a view similar to that of FIG. 3, but depicting the pole tip assembly in its other stable position;

FIG. 5 is a plan view of the pole tip assembly in the stable position depicted in FIG. 3;

FIG. 6 is a view in section taken in the plane 6—6 of FIG. 3; and

FIG. 7 is a fragmentary view depicting a slight modification of the pole tip assembly of the preceding figures.

Referring to the drawings for details of my invention, the pole tip assembly 1 comprises a cap 3 which is bifurcated at one end to form parallel extending walls 5 and 7, and at its other end, having a tapered pole end receiving recess 9 for mounting at the tip of a fishing pole 11, said recess including at its inner end, a cylindrical threaded portion 13.

A tip mounting 15 involving a tapered shank 17 adapted to receive a conventional tip 19, includes an integral base 21 and a blade 23 extending longitudinally from the base and adapted to fit between the parallel walls 5, 7 of the bifurcated end of the cap, to substantially the base of said walls. A pin 25 through the walls and the blade, provides means for hingedly securing the tip mounting 15 to the cap 3.

One corner 27 of the blade 23 is rounded off while the corresponding corners 29 of the parallel extending walls 5, 7 are similarly rounded to permit of hinged movement of the tip mounting 15 with respect to the cap 3 in one direction of rotation only, from a position of alignment of the tip mounting with respect to the cap. The remaining or unrounded corners of the blade and extension walls serve as stops in determining the aligned position of the tip mounting.

While the hinge pin and rounded corners permit of free hinge movement of the tip mounting in one direction, to accomplish the objects of the present invention requires that the tip mounting be stabilized in at least two positions within the range of permissible movement thereof on the hinge pin and releasable under pressure from either of such stable positions. One such stable position should preferably be with the tip mounting in alignment with the cap; e.g., along the longitudinal axis 31 thereof, while the other might be any of a number of points in the range of its permissible hinge movement but preferably at that point where the tip mounting makes an angle of the order of 30 degrees with said longitudinal axis.

Toward this end, the blade is provided in its edge, with a pair of recesses 35, 37 so located that one or the other will lie on the longitudinal axis 31 of the cap when the tip mounting is in one or the other of its desired stable positions.

For cooperation with such recesses in determining the stable positions of the tip mounting, I provide a spring pressed pin assembly including a headed pin 39 or equivalent latch element, extended through the bifurcated end of the cap and emerging between said extending walls, such pin being held under compression by a compression spring 41 within the cap adjacent the head of the pin and maintained under compression by a set screw 43 secured within the threaded cylindrical portion of the cap recess to adjustably compress the spring and place pressure on the pin.

From this arrangement, it will be apparent that the exposed end of the pin will ride along the edge of the tip mounting blade until the angular movement of the blade on the hinge pin brings one or the other recesses into alignment with the pin, at which moment the pin will enter the recess and stabilize the tip mounting at the position then occupied.

However, due to the compressibility of the spring, the pin is releasable under pressure such as occasioned by the application of a rotating force to the tip mounting. Thus the tip mounting may be set to either position manually or otherwise released by pressure applied thereto.

For use in the conventional manner, that is, when the pole is held by the fisherman, the tip mounting should be positioned in alignment with the cap and held in such position against hinge movement on the pin. Accordingly, I provide means for locking the tip mounting in such position of alignment, and for this purpose may resort to either of two locking means.

One such locking means is depicted in FIG. 6 wherein I provide a locking screw 47 threaded through one of the extending walls 5 to enter an opening or hole 49 in the tip mounting blade, when the tip mounting is in the desired aligned position.

The alternative locking means as depicted in FIG. 7, involves a wire spring 51 anchored at one end to the side of the cap and bent to substantially a right angle at its other end to permit entrance thereof through a hole 53 provided in one of the extension walls 5 in alignment with the hole 49 in the blade of the tip mounting.

When a fishing pole provided with my improved tip assembly is to be left unattended, the tip mounting is unlocked either by unthreading the locking screw 47 or by withdrawing the spring 51 and manually urging it to its other stable position making an angle of the order of 30 degrees with the longitudinal axis of the cap. A tug on the line, as can occur when a fish grabs for the baited hook, will cause a sudden release of the tip mounting, followed by a sudden stopping thereof when it reaches its aligned position, thereby causing the hook to set and leaving the fish securely anchored to the hook.

From the foregoing description of my invention in its preferred form, it will be apparent that it fulfills all the objects of the invention, and while I have illustrated and described the same in its preferred form, it will be apparent that the invention as illustrated and described is subject to alteration and modification without departing from the underlying principles involved, and I accordingly do not desired to be limited in my protection to those details illustrated and described, except as may be necessitated by the appended claims.

I claim:

1. A pole tip assembly for a fishing pole comprising a cap bifurcated at one end to form parallel extension walls and at its other end having a tapered pole end receiving recess including at its inner end a cylindrical threaded portion; a tip mounting involving a tapered shank adapted to receive a tip, a base at the broad end of said shank and a blade extending longitudinally from said base and adapted to fit between said extension walls to substantially the full length thereof; a hinge pin through said extension walls and said blade; said blade having one corner rounded off and said extension walls having their corresponding corners rounded off to permit hinge movement of said tip mounting about said hinge pin in one direction from a position of alignment of said tip mounting with respect to the longitudinal axis of said cap; means establishing a pair of pressure releasable stable positions of said tip mounting, one in alignment with said longitudinal axis and one at an angle thereto, said means including a latch element in the end of said cap between said extension walls and exposable to pressure from within said cap, a compression spring within said cap in pressure engagement with said latch element and a set screw secured in said cylindrical threaded portion of said cap recess in contact with said spring, and said blade having spaced recesses in the edge thereof adapted to be engaged by said latch element during hinge movement of said tip mounting and when said tip mounting reaches either of said positions; and means for locking said tip mounting in its aligned position.

2. A pole tip assembly for a fishing pole comprising a cap bifurcated at one end to form parallel extension walls and at its other end having a tapered pole and receiving recess including at its inner end a cylindrical threaded portion; a tip mounting involving a tapered shank adapted to receive a tip, a base at the broad end of said shank and a blade extending longitudinally from said base and adapted to fit between said extension walls to substantially the full length thereof; a hinge pin through said extension walls and said blade; said blade having one corner rounded off and said extension walls having their corresponding corners rounded off to permit hinge movement of said tip mounting about said hinge pin in one direction from a position of alignment of said tip mounting with respect to the longitudinal axis of said cap; means establishing a pair of pressure releasable stable positions of said tip mounting, one in alignment with said longitudinal axis and one at an angle of the order of 30 degrees thereto, said means including a latch element in the end of said cap between said extension walls and exposable to pressure from within said cap, a compression spring within said cap in pressure engagement with said latch element, and a set screw secured in said cylindrical threaded portion of said cap recess in contact with said spring, and said blade having spaced recesses in the edge thereof adapted to be engaged by said latch element during hinge movement of said tip mounting and when said tip mounting reaches either of said positions; and means for locking said tip mounting in its aligned position.

References Cited in the file of this patent

UNITED STATES PATENTS

| 1,984,349 | Gurrieri et al. | Dec. 11, 1934 |
| 2,580,130 | Rowdon | Dec. 25, 1951 |

FOREIGN PATENTS

| 287,415 | Great Britain | Mar. 22, 1928 |
| 750,885 | Great Britain | June 20, 1956 |